United States Patent Office 3,095,265
Patented June 25, 1963

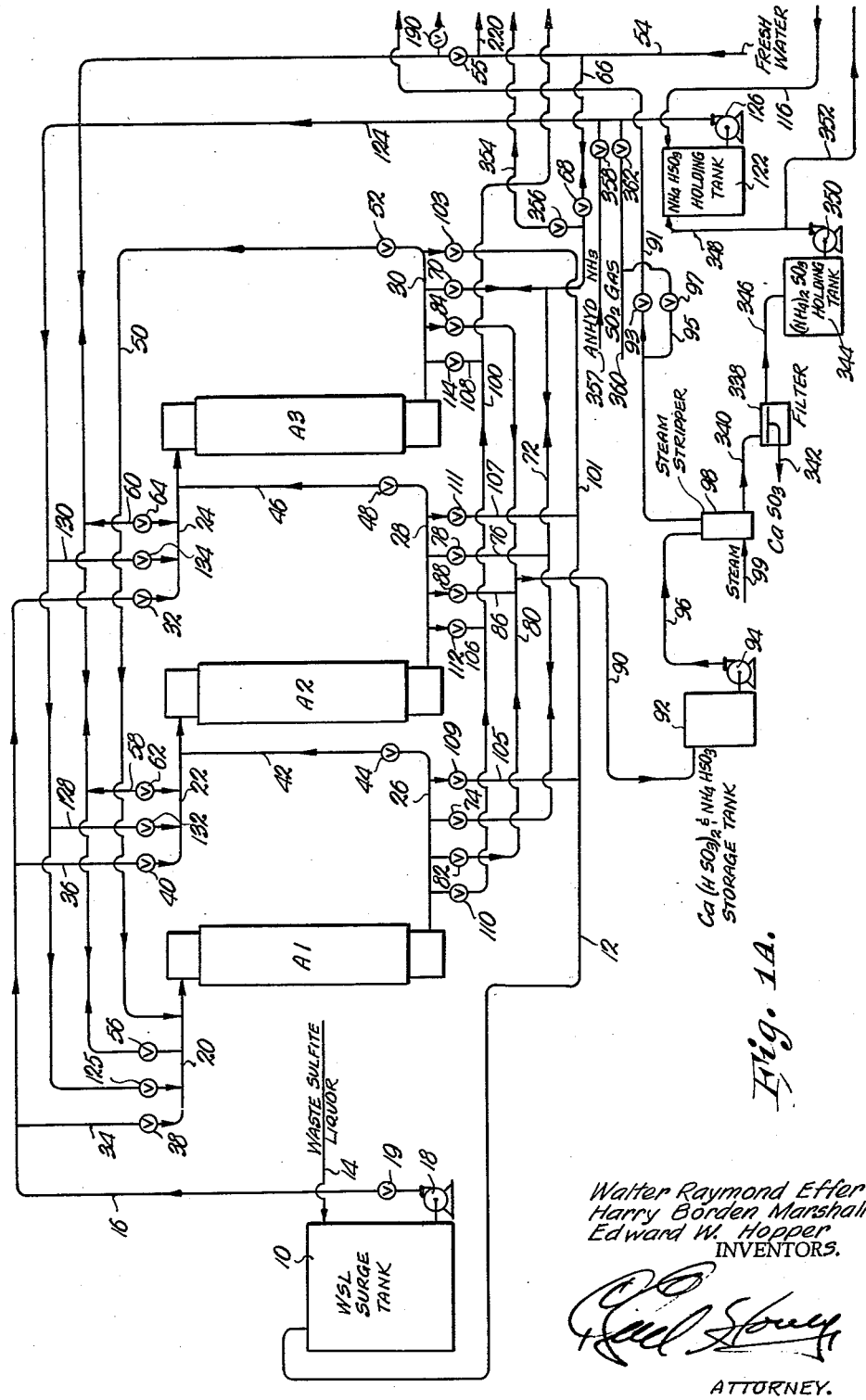

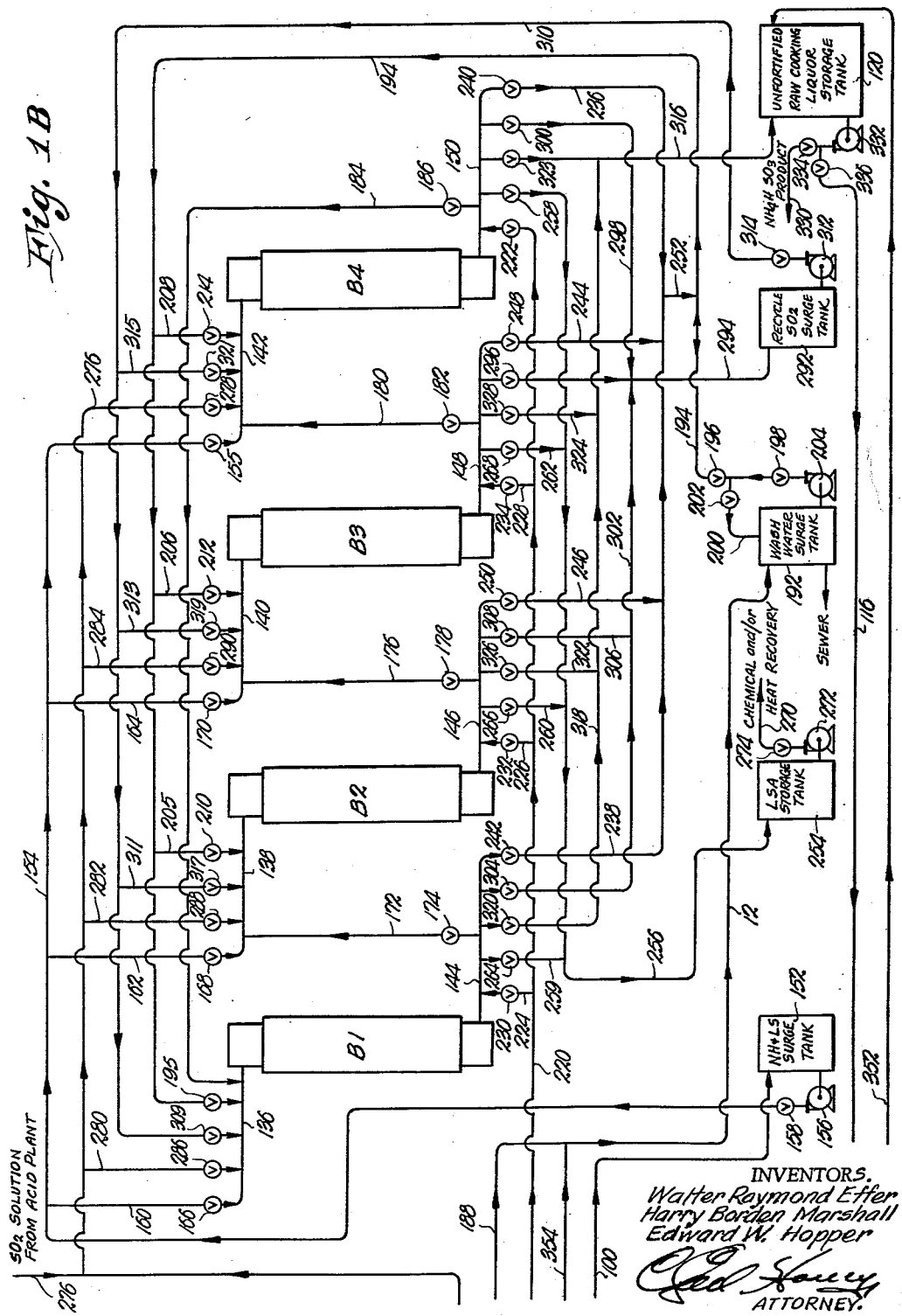

3,095,265
ION EXCHANGE PROCESS FOR RECOVERY OF MONOVALENT IONS FROM WASTE SULFITE PULPING LIQUOR
Walter Raymond Effer, Agincourt, Ontario, and Harry Borden Marshall, Toronto, Ontario, Canada, and Edward William Hopper, Pittsburgh, Pa., assignors to J. F. Pritchard & Co., Kansas City, Mo., a corporation of Missouri
Filed Nov. 3, 1958, Ser. No. 771,509
13 Claims. (Cl. 23—49)

This invention relates to an ion exchange method of treating the waste sulfite liquor resulting from monovalent cation sulfite pulping of lignin containing fibrous materials for selectively separating the valuable monovalent cations from contaminating multivalent cations contained in the waste liquor. The process is utilizable for recovery of monovalent cations from monovalent base sulfite waste liquors recovered from the manufacture of wood pulp by either the acid or neutral sulfite pulping methods.

During recent years there has been a very pronounced trend by the wood pulp industry towards the use of soluble-base, sulfite pulping liquors in particular, sodium and ammonium base, of the acid sulfite or neutral sulfite type. The use of monovalent sulfite pulping liquors has important advantages over prior methods because of relatively higher yield, much shorter expired pulping time, greater variety of species of wood which may be processed and a higher quality of pulp produced. However, widespread acceptance of monovalent sulfite pulping liquors as a medium for manufacturing pulp from various species of wood has not heretofore been accomplished because of the fact that soluble-base liquors of this type are more expensive than the conventional multivalent base liquors, e.g., calcium, which have been in use for a period of years. Considerable research effort has been expended in an attempt to develop a suitable process for the recovery of monovalent cations from monovalent type waste sulfite pulping liquors, to thereby reduce the cost of processing with these types of chemicals and render the method competitive with calcium or magnesium base liquor processes.

It has been previously proposed to remove the monovalent cations from waste monovalent base sulfite liquors by passing the liquid through a bed containing a quantity of an ion exchange resin wherein the monovalent cations replace the hydrogen ions on the resin. The lignosulfonic acid liquor effluent passing from the resin bed is then treated for recovery of heat and/or chemicals, while the monovalent cations deposited on the resin are removed from the same by regeneration with sulfurous acid to form a sulfite pulping liquor in condition for utilization in further pulping processes. These prior methods have certain disadvantages in that they do not make provision for the removal of multivalent cations contained in the waste sulfite liquor flowing from the digester and which are preferentially absorbed on the ion exchange resin. Thus, the efficiency of the particular resin is decreased to the point where it is necessary to replace such resin or utilize a strongly acidic regenerant such as hydrochloric acid to place the resin in condition for further use in the monovalent cation recovery procedure. Manifestly, this precludes setting up of a practical recovery system because the overall cost of operation of the recovery plant is prohibitive.

It is well known that wood, commercially supplied water and certain pulping chemicals contain a relatively small percentage of inorganic substances, but the effect these compounds have on monovalent cation recovery operaitons has not heretofore been fully appreciated, nor a satisfactory method provided for preventing such contaminanats from lowering the efficiency of the recovery process. For example, wood of the type normally utilized in pulping operations contains approximately 0.3% by weight of ash and thus, in the manufacture of 1 ton of pulp requiring approximately 2 tons of wood, over 12 pounds of ash is introduced into the pulping system and which is composed principally of calcium but contains other multivalent cations such as magnesium, iron and manganese, as well as a small proportion of monovalent cations in the nature of sodium and potassium. Also, the commercially supplied process water used in the manufacture of 1 ton of pulp amounts to approximately 2000 gallons per ton and, at a median hardness of approximately 100 parts per million, this quantity of water contains about 1.7 pounds of additional inorganic materials, mainly of the multivalent cation type such as calcium and magnesium. From the foregoing example, it can be recognized that for every tone of pulp produced, approximately 14 pounds of extraneous inorganic substances are introduced into the pulping liquor and it has been found that in a 300 ton per day pulp mill, as much as 1600 to 3000 pounds of calcium oxide per day may be introduced into the pulping liquors from the wood and process water used. The problem presented is the development of a commercially feasible method of recovering useful monovalent cations from the waste sulfite pulping liquor contaminated with a large proportion of multivalent, inorganic substances as defined above.

As noted above, prior ion exchange processes for the recovery of monovalent cations from pulping liquors failed to recognize the inherent difficulties caused by the accumulation of the multivalent cations such as calcium, magnesium, iron and manganese on the ion exchange resins, thereby progressively decreasing the efficiency of the resins, and therefore, such prior methods were not commercially practical. It is of the utmost importance that multivalent cations be substantially eliminated in any process for the recovery of monovalent cations from waste sulfite liquors wherein ion exchange resins are utilized as the basic recovery medium.

Multivalent cations accumulate on ion exchange resins during a recovery process of the type outlined because of the fact that such multivalent cations are perferentially absorbed on the resin over the monovalent cations and thus, these multivalent cations accumulate on the resin as waste sulfite liquor is passed through the same unless provision is made for cyclically regenerating the resin to displace the multivalent cations therefrom.

It is, therefore, the primary object of this invention to provide a process for recovery of monovalent cations from waste sulfite pulping liquors by ultization of ion exchange resins in a cyclic, continuously operable system without accumulation of polyvalent cations on the exchange resins which would gradually decrease the degree of recovery of useful monovalent cations.

A further important object of the instant invention is to provide an ion exchange method of treating the waste sulfite liquor resulting from monovalent cation sulfite pulping of wood for selectively separating monovalent cations from multivalent cations contained in the liquor, wherein the contaminating polyvalent cations may be removed from the ion exchange resins without the introduction of any chemicals into the system not utilized in the pulping process itself.

Another important object of this invention is to provide a method of treating waste sulfite liquor to recover valuable monovalent cations contained therein, wherein a monovalent cation bisulfite regenerant is utilized for removing multivalent cations from certain of the beds of resins after passage of waste sulfite liquor through such beds whereby effective regeneration of the latter is obtained by virtue of the relatively high degree of ionization of the bisulfite regenerant.

Also an object of the instant invention is to provide a recovery process as defined above wherein the lignosulfonic acid produced during the recovery operation is relatively free from both monovalent and multivalent cations and is thereby substantially in the hydrogen form permitting the same to be utilized as a base for subsequent concentration or modification to produce various end products.

Also an aim of this invention is to provide an ion exchange process for recovery of monovalent cations from waste sulfite pulping liquor which may be carried out by utilization of conventional, easily assembled apparatus containing a minimum of operations to thereby lower the initial cost of the recovery plant and furthermore, materially lessen the cost of maintenance and operation of the system.

Other important objects of this invention relate to the provision of an ion exchange method of treating the waste sulfite liquor resulting from monovalent cation sulfite pulping of wood, wherein the monovalent cations are selectively separated from the multivalent cations contained in the liquor by initially passing the waste liquor through a pair of beds of ion exchange resins in successive order to exchange multivalent cations in the waste liquor for monovalent cations initially placed on the exchange resins and then subsequently, passing the effluent from the last of the first beds of resins successively through a second pair of ion exchange resins initially in the hydrogen form to interchange the valuable monovalent cations in the waste liquor effluent for the hydrogen ions on the resin, whereby utilization of the first pair of resins to exchange the multivalent cations substantially prevents contamination of the second pair of resins with such polyvalent cations; to a process as outlined above wherein the second pair of ion exchange resins having the valuable monovalent cations thereon are regenerated by passing a solution of sulfurous acid successively through at least one partially regenerated resin bed and then through at least one fully loaded resin bed to thereby effect a higher degree of regeneration of the latter; to the provision of a method of recovering the multivalent cations initially deposited on the first beds of ion exchange resins, in suitable condition for forming a multivalent cation sulfite pulping liquor or for utilization in the preparation of various by-products; to the provision of a system for treating the waste sulfite liquor resulting from monovalent cation sulfite pulping of wood which is equally applicable in recovering various types of monovalent cations such as ammonium, potassium and sodium, and is also suitable for treatment of both neutral sulfite type liquors as well as acid sulfite cooking liquors; to the provision of an ion exchange process for recovering monovalent cations from waste sulfite pulping liquors wherein solid components contained in the liquor, such as wood fibers and the like, are periodically removed from the resins employed in the process to thereby preclude accumulation of solids which would tend to reduce the rate of liquid flow through the resin beds; to the provision of a system wherein readily available resins may be employed and contamination of the same with multivalent cations is substantially eliminated so that such resins may be utilized for an indefinite period without replacement or complete regeneration with strong mineral acids such as hydrochloric acid and the like; and to other important objects and salient features of the instant invention which will become obvious or be explained more fully as the following description progresses.

Briefly, the present process contemplates the provision of three beds of strongly acid ion exchange resins in a first series, whose purpose is to preferentially absorb polyvalent cations contained in the waste sulfite liquor, and four beds of strongly acid ion exchange resins in a second series which serve to absorb the valuable monovalent cations contained in the waste sulfite liquor effluent passing from the first series of resins in exchange for hydrogen ions contained on the same. The various beds of resins are suitably interconnected by piping, valves, pumps, tanks, instruments and other mechanical appurtenances necessary to permit the apparatus to be employed as a continuous cyclic operation. The ion exchange resins are preferably of the same type and normally, a strongly acid resin. As used herein, the term monovalent cations is meant to signify cations such as ammoniuum, potassium or sodium and does not include hydrogen ions, which will be referred to at all times by the specific terminology in order to distinguish between the various types of ions. By the same token, multivalent cations are intended to designate various polyvalent cations such as calcium, magnesium, manganese, iron and other multivalent cations found in waste sulfite pulping liquors of the type referred to herein.

The waste sulfite liquor from the pulping digesters is initially passed successively through a pair of ion exchange resin beds in the first series, the multivalent cations contained in the liquor being interchanged for monovalent cations previously deposited on the exchange resins, and then subsequently the waste liquor effluent from the last of the first pair of ion exchange resins is passed successively through a pair of beds of ion exchange resins in the second series set forth above, with the monovalent cations in the waste liquor effluent being exchanged for hydrogen ions initially placed on the resins of the second series. The polyvalent cations are preferentially absorbed on the ion exchange resins in the first multivalent loading column, thereby replacing a substantial portion of the monovalent cations initially placed thereon with the percentage of interchange being largely dependent upon the concentration of multivalent cations in the waste feed liquor. A proportion of the multivalent cations leak from the first polyvalent cation loading column prior to establishment of an equilibrium concentration of multivalent cations between the influent passing into the first bed of resin and the effluent egressing therefrom, and the multivalent cations passing from the first resin are preferentially absorbed on the ion exchange resin in the second bed of the first series.

After the first bed of ion exchange resins in the second series of columns has absorbed a maximum quantity of monovalent cations, it is removed from the loading cycle and the next fully regenerated resin bed is placed on stream behind the partially loaded resin bed. Simultaneously therewith, a solution of sulfurous acid is either passed through one fully monovalent cation loaded resin bed or through at least one partially regenerated resin bed of the second series as well as through at least one fully loaded resin bed therein whereby regeneration of the single bed referred to or the first bed of a pair of resin beds is effected. The effluent from the sulfurous acid regeneration operation constitutes fresh cooking liquor which may all be passed to the digesters after fortification, or a portion thereof may be by-passed to the regenerant for the first series of resin beds. As previously described, after passage of additional quantities of monovalent cations and sulfurous acid into the regenerant for the first series of beds, this solution is adapted for removing multivalent cations from the resins of the first series in an efficient manner.

When the concentration of multivalent cations in the waste sulfite liquor effluent from the first polyvalent loading column in the first series of resins approaches equilibrium with the concentration of multivalent cations in the waste liquor influent into such column, the third ion exchange resin bed in the first series is placed on stream in successive order after the second resin bed whereupon the first bed is regenerated by passing a quantity of the strong monovalent cation bisulfite regenerant through the same to thereby interchange monovalent cations contained in the bisulfite regenerant for the multivalent cations absorbed on the specified resin.

The effluent from regeneration of the first polyvalent loading column is subjected to a treating operation to substantially precipitate and remove the multivalent cations contained therein, whereupon the stripped effluent is fortified with the required amounts of monovalent cations and sulfur dioxide to produce a regenerating solution adapted to again be passed through a resin fully loaded with multivalent cations to regenerate the same.

The recovery process outlined above is designed for continuous, cyclic operation and which is better understood when viewing the schematically presented apparatus in the accompanying drawings.

FIGURES 1-A and 1-B are a diagrammatic view in the nature of a flow chart, illustrating a cyclic process for treating waste sulfite liquor resulting from monovalent cation sulfite pulping of wood for selectively recovering monovalent cations from the liquor.

Apparatus broadly designated 12 includes a first series of exchange columns A1, A2 and A3 adapted for removing polyvalent cations from the waste sulfite liquor, as well as a second series of exchange columns B1, B2, B3 and B4, designed for separating the monovalent cations from the liquor for reuse in preparation of fresh pulping liquor.

Waste sulfite liquor from the pulp mill is directed into surge tank 10 through a conduit 14 and is conveyed to exchange columns A1, A2 or A3 via pipe 16. Intermittently operable pump 18 in pipe 16 serves as means for forcing the waste sulfite liquor through pipe 16 at predetermined intervals and at a selected flow rate, while valve 19 in pipe 16 downflow from pump 18 controls flow of liquor to columns A1, A2 or A3.

Headers 20, 22 and 24 communicate with respective upper ends of exchange columns A1, A2 and A3, and headers 26, 28 and 30 are connected to and communicate with corresponding lower ends of respective exchange columns A1, A2 and A3. Pipe 16 is connected to header 24 and is provided with a valve 32 therein controlling flow of liquor through pipe 16, while branches 34 and 36 intercommunicating pipe 16 and headers 20 and 22 respectively have valves 38 and 40 therein respectively.

Conduit 42 having a valve 44 therein interconnects headers 26 and 22, while a similar conduit 46 provided with a valve 48 therein intercommunicates headers 24 and 28. Pipe 50 connected to the outer end of header 30 communicates with header 20 and has a valve 52 therein for permitting selective control of flow of fluid through pipe 50.

Line 54 connected to a suitable source of fresh water communicates directly with header 20 and has valves 55 and 56 therein, while short cross-pipes 58 and 60 having valves 62 and 64 therein respectively interconnect line 54 with corresponding headers 22 and 24. An upflow backwash line 66 controlled by valve 68 intercommunicates with header 30 through a valve 70, and a branch line 72 is coupled with header 26 through a valve 74. Cross-line 76 interconnecting header 28 and branch line 72 and provided with a valve 78 therein permits water to be directed into header 28 and thereby exchange column A2 when desired.

By-pass conduit 80 is connected to headers 26 and 30 respectively and has a valve 82 adjacent header 26 and a valve 84 proximal to header 30. Effluent line 86 coupled with header 28 is also connected to by-pass conduit 80 and is provided with a valve 88 controlling flow of effluent through line 86. Pipe 90 communicates calcium bisulfite and ammonium bisulfite storage tank 92 with by-pass conduit 80, while pump 94 in line 96 interconnecting tank 92 and a steam stripper 98 forces effluent from tank 92 into stripper 98. Sulfur dioxide line 91 leads from steam stripper 98 to the acid plant conduit 276 and flow of gas is controlled by valve 93 while a by-pass pipe 95 coupled with line 91 downflow from valve 93 and interconnecting line 95 with sulfur dioxide supply line 360 has a control valve 97 disposed therein.

Steam line 99 joined to stripper 98 supplies steam to the latter at a predetermined temperature and flow rate.

Drain line 100 connected to header 26 and provided with a valve 110 therein also communicates with headers 28 and 30 respectively by branches 106 and 108 having corresponding valves 112 and 114. A second drain conduit 101 communicating with header 30 and leading to tank 10 is controlled by a valve 103 while drain by-pass pipes 105 and 107 having respective control valves 109 and 111 connect conduit 101 with corresponding headers 26 and 28.

Line 116 interconnects unfortified raw cooking liquor storage tank 120 with ammonium bisulfite regenerant holding tank 122, and the regenerant solution is conveyed to headers 20, 22 and 24 by a pipe 124 coupled with tank 122 and header 20 respectively and provided with a pump 126 therein adjacent tank 122. Valve 125 in pipe 124 adjacent header 20 controls flow of elutant through pipe 124. By-pass branches 128 and 130 provided with valves 132 and 134 respectively intercommunicate headers 22 and 24 with pipe 124.

Exchange columns B1, B2, B3 and B4 are likewise provided with corresponding upper headers 136, 138, 140 and 142, as well as lower headers 144, 146, 148 and 150 communicating with the lower ends of respective exchange columns B1, B2, B3 and B4. Ammonium lignosulfonate surge tank 152 receiving the effluent from the A columns through drain line 100 is connected to header 142 through a conduit 154 having a pump 156 therein proximal to tank 152, as well as valves 155 and 158 disposed downflow from pump 156. By-pass lines 160, 162 and 164 having respective valves 166, 168 and 170 therein intercommunicate conduit 154 and corresponding headers 136, 138 and 140. Cross-line 172 having a valve 174 therein interconnects headers 138 and 144, cross-line 176 controlled by valve 178 is coupled with headers 140 and 146 respectively, crossline 180 provided with a valve 182 therein intercommunicates headers 142 and 148, and cross-line 184 having a valve 186 therein is connected at opposite ends thereof to headers 150 and 136.

Wash water line 188 having a valve 190 therein is connected to wash water surge tank 192 and the latter in turn is coupled with header 136 by a line 194 provided with valve 195 and valves 196 and 198 disposed on opposed sides of a by-pass line 200 interconnecting line 194 and tank 192 and having a valve 202 controlling flow through the same. Pump 204 in line 194 adjacent tank 192 serves to force wash water to respective exchange columns B1, B2, B3 and B4 at a predetermined rate. In this connection, it is to be noted that conduits 205, 206 and 208 having respective valves 210, 212 and 214 interconnect pipe 194 with corresponding headers 138, 140 and 142.

A second wash water line 220 coupled directly to fresh water line 54 is connected to header 150 and is provided with a control valve 222. Pipes 224, 226 and 228 controlled by valves 230, 232 and 234 respectively communicate respective headers 144, 146 and 148 with wash water line 220. Wash water is returned from exchange columns B1, B2, B3 and B4 via lines 236 and 238 coupled with headers 150 and 144 and provided with valves 240 and 242 respectively, as well as by conduits 244 and 246 communicating with corresponding headers 148 and 146 and having respective valves 248 and 250 therein, it being noted that lines 236 and 238 are coupled with line 194 through a cross-pipe 252.

Ligninsulfonic acid effluent from exchange columns B1, B2, B3 and B4 is received within storage tank 254 by virtue of conduit 256 connected to header 150 and controlled by valve 258, as well as by header pipes 259, 260 and 262 interconnecting conduit 256 and corresponding headers 144, 146 and 148 and each provided with respective control valves 264, 266 and 268. Line 270 having a pump 272 and a valve 274 therein directs ligninsulfonic acid effluent from storage tank 254 to a suitable chemical and/or heat recovery unit.

Means for regenerating exchange columns B1, B2, B3 and B4 includes a sulfurous acid conduit 275 leading from the acid plant of the wood pulping mill and in turn, coupled to header 142 and provided with a valve 278 therein proximal to the stipulated header. Acid lines 280, 282 and 284 interconnecting conduit 276 and corresponding headers 136, 138 and 140 serve to supply acid to exchange columns B1, B2 and B3, it being noted that lines 280, 282 and 284 are provided with respective valves 286, 288 and 290 for controlling of acid regenerant therethrough.

Recycle sulfurous acid surge tank 292 receives the acid from exchange columns B1, B2 B3 and B4 via a conduit 294 intercommunicating tank 292 and header 148 and provided with a control valve 296 therein, as well as through line 298 connected to header 150 and controlled by valve 300, line 302 coupled with header 144 and having a valve 304 therein and a branch line 306 controlled by valve 308.

The sulfurous acid may be recycled over any of the exchange columns B1, B2, B3 and B4 desired by virtue of the provision of line 310 having a valve 309 therein and connected to surge tank 292 and header 136 respectively, there being a pump 312 in line 310 adjacent tank 292, as well as a control valve 314 therein located downflow from pump 312. Sulfurous acid from line 310 is supplied to headers 138, 140 and 142 by corresponding pipes 311, 313 and 315 connected to line 310, flow of acid through pipes 311, 313 and 315 being controlled by respective valves 317, 319 and 321. The raw, unfortified ammonium bisulfite cooking liquor produced by regeneration of certain of the exchange columns B1, B2, B3 or B4 is directed into storage tank 120 through a pipe 316 connected directly to header 150 and controlled by valve 323 and further, by line 318 intercommunicating header 144 and pipe 316, controlled by valve 320 and furthermore, by cross-pipes 322 and 324 coupling respective headers 146 and 148 with line 318 and controlled by corresponding valves 326 and 328.

Outlet line 330 connected to tank 120 and having a pump 332 and valve 334 therein serves to direct fresh unfortified ammonium bisulfite pulping liquor to suitable apparatus for directing required amounts of sulfurous acid and ammonia into the solution whereby the liquor may then be introduced into the digesters for treating the wood chips. Regenerant line 116 is in turn coupled with outlet line 330 for directing unfortified pulping liquor into solution holding tank 122. Valve 336 in regenerant line 116 adjacent outlet line 330 controls flow of ammonium bisulfite pulping liquor through line 116.

The calcium bisulfite-ammonium bisulfite solution is stripped within steam stripper 98, thereby converting the bisulfites to sulfite salts, and is then directed to a filter 338 through a conduit 340, whereupon the calcium sulfite precipitate is conveyed to a suitable recovery plant through line 342 and recovered ammonium sulfite passes from filter 338 to ammonium sulfite solution holding tank 344 via conduit 346. A line 348 interconnecting ammonium sulfite holding tank 344 and ammonium bisulfite holding tank 122 is provided with a pump 350 therein for forcing the solution from tank 344 to holding tank 122 at a predetermined flow rate. Furthermore, a bypass conduit 352 coupled with line 348 downflow from pump 350 intercommunicates line 348 and ammonium bisulfite solution storage tank 120.

A wash water pipe 354 having a control valve 356 therein is connected to line 66 downflow from valve 68 and to line 188 downflow from valve 190. Means for fortifying the ammonium bisulfite regenerant solution prior to introduction of the same into exchange columns A1, A2 or A3 takes the form of an anhydrous ammonia conduit 357 controlled by valve 358, as well as a sulfur dioxide line 360 having a valve 362 therein. It can be appreciated that ammonia pipe 357 and sulfur dioxide line 360 are connected to suitable sources of supply of these materials.

It is to be understood that before apparatus 12 is placed on stream to recover valuable monovalent cations from the waste sulfite cooking liquor resulting from pulping of the wood chips, the ion exchange resins contained in columns A1, A2, A3, B1, B2, B3 and B4 must be placed in proper condition for permitting continuous, cyclic operation of the system. As heretofore noted, the ion exchange resins utilized in all of the exchange columns are preferably of the same type and best results have been obtained by utilization of nuclear sulfonic acid resins having a styrene base. These resins are probably sulfonated styrene-divinyl benzene compositions and examples of suitable resins are "Dowex-50" (Nalcite HCR) and "Dowex-50W" produced by Dow Chemical Company, "Chempro C–20" manufactured by Chemical Process Company, "Permutit Q," a proprietary product of the Permutit Company of the United States, "Zeo Carb 225" produced and distributed by Permutit Company, Ltd., and "Amberlite IR–120" produced by Rohm and Haas Co., Philadelphia, Pennsylvania.

In order to simplify description of the operation of apparatus 12, it is assumed that the monovalent cation recovery system is in cyclic operation and handling an ammonia base waste sulfite liquor. Therefore, each of the resin beds A1, A2, A3, B1, B2, B3 and B4 is in a predetermined condition to be hereinafter defined. Considering first exchange column A1, it is to be understood that at the arbitrary point at which description of operation of apparatus 12 is begun, the ion exchange resin in column A1 has been eluted, drained, washed and backwashed in a manner to be more fully explained during the following description of operational procedure. The resin in column A1 has been washed to displace the ammonium bisulfite regenerant held in the interstices of the resin and this liquor was conducted to the ammonium bisulfite-calcium bisulfite storage tank 92. Furthermore, the resin bed in column A1 was backwashed with fresh water to reclassify the resin and wash out solid particles of dirt, fiber, etc. which may have been filtered out or collected on top of the bed during passage of waste sulfite liquor from tank 10 through column A1.

The operational cycle so far as the ion exchange resin in column A1 is concerned begins when the latter is placed in the second position in series flow with the resin in exchange column A3, which had previously been in the second position of the loading cycle and is now moved to the No. 1 position to complete its cation loading cycle. Therefore, it is pointed out that valve 19 is in its normally continuously open position and pump 18 is being operated to force waste sulfite liquor from surge tank 10 through pipe 16 to thereby cause such waste liquor to be successively directed through a pair of the ion exchange columns A1, A2 and A3. As the operational cycle herein described begins, valves 32, 52, 74 and 356 are open to permit the waste sulfite liquor from surge tank 10 to be distributed successively through exchange columns A3 and A1 via pipe 16, header 24, column A3, header 30, pipe 50, header 20 and into column A1. It is pointed out that all valves in the present apparatus are understood to be closed unless specifically described as being open with the exception of certain normally continuously open valves such as 19 in line 16 leading from surge tank 10. The waste sulfite liquor entering column A1 displaces the water remaining therein from the prior backwashing step and the water thus displaced and equal in volume to the capacity of column A1 is directed to wash water surge tank 102 via line 72, line 66, pipe 354 and wash water line 188. As soon as the wash water is displaced from column A1, valves 74 and 356 are closed and valve 110 opened to permit the effluent from column A1 to flow into drain line 100 via header 26 whereby the same passes into ammonium lignosulfonate surge tank 152. Passage of the waste sulfite liquor successively through columns A3 and A1 is continued until the resin in column A3 is substantially saturated with multivalent cations such as calcium, magnesium, iron and manganese preferentially absorbed onto the resin and thereby replacing ammonium cations initially disposed on the ion exchange resin. As soon as the concentration of multivalent cations contained in the effluent from column A3 through header 30 approaches the concentration of multivalent cations contained in the waste sulfite liquor passing from header 24 into the upper end of column A3, valves 32, 52 and 110 are closed while substantially simultaneously therewith, valves 55 and 60 are opened for a sufficient time only to permit fresh water from line 54 and directed to column A3 via cross-pipe 60 and header 24, to displace the waste liquor in column A3 through the route traced above. Thereupon, valves 55 and 60 are closed while valves 38, 44, 78 and 356 are opened to cause the waste sulfite liquor from surge tank 10 to pass through branch 34, header 20, exchange column A1, header 26, conduit 42 and into exchange column A2. The wash water retained in column A2 from the previous regeneration step is displaced from column A2 into wash water surge tank 192 via header 28, cross-line 76, line 72, pipe 354 and wash water line 188. Upon complete displacement of the water from column A2, valves 78 and 356 are closed and valve 112 opened to permit the ammonium lignosulfonate effluent from column A2 to flow into ammonium lignosulfonate surge tank 152 via drain line 100.

It has been determined that multivalent cations begin to leak from the first column through which the waste liquor is passed, with the lignosulfonate effluent therefrom prior to attainment of multivalent cation equilibrium within the ion exchange resin contained in such first column and which would be indicated by equal multivalent cation concentrations in the solution passing into as well as out of column A3. Thus, with respect to the stream flow first described relative to passage of waste sulfite liquor successively through exchange columns A3 and A1, it can be recognized that most of the multivalent cations leaking with the effluent from column A3 are absorbed on the ion exchange resin in column A1 which was in a substantially regenerated condition. Furthermore, after removal of exchange column A3 from the loading cycle as described above, the waste sulfite liquor is then initially directed into the resin in column A1 which has been partially loaded with multivalent cations in the first cycle of operation. Similarly, the ion exchange resin in column A2 has been freshly regenerated, drained, washed and backwashed in a previous operation to be hereinafter more fully described, so that subsantially quantitative separation of multivalent cations leaking with the effluent from exchange column A1 is obtained because of the relatively low concentration of multivalent cations contained on the resin in column A2.

Immediately upon removal of exchange column A3 from the multivalent cation loading cycle, a relatively strong ammonium bisulfite regenerant is conducted through the ion exchange resin in column A3 in order to regenerate the bed and substantially remove the multivalent cations absorbed onto the resin during the loading cycle thereof. Such elution of exchange column A3 is accomplished by ammonium bisulfite regenerant from holding tank 122 and suitably fortified while being directed through pipe 124 by pump 126. Valve 134 is opened to permit the regenerant to pass from pipe 124 through by-pass branch 130 and header 24 into the upper end of column A3. Initially, valves 70 and 356 are opened to permit the quantity of wash water contained within column A3 to pass to wash water surge tank 192 via line 66, pipe 354 and wash water line 188, it being understood that as soon as all of the wash water is forced out of exchange column A3 by the ammonium bisulfite regenerant, valves 70 and 356 are closed and valve 84 is opened to cause the effluent from exchange column A3 to flow to calcium bisulfite and ammonium bisulfite storage tank 92 through by-pass conduit 80 and pipe 90 into tank 92.

The original regenerant solution utilized in regeneration of ion exchange column A3 may be prepared in part by directing a portion of the unfortified ammonium bisulfite cooking liquor from storage tank 120 through regenerant line 116 into regenerant solution holding tank 122 after opening of valve 336 and upon operation of pump 332. The preparation of a suitably fortified ammonium bisulfite regenerant will be described in greater detail with reference to exchange columns B of apparatus 12, but it is to be pointed out that under normal conditions of operation, to be more fully understood hereinafter, the regenerant stored in tank 120 is not sufficiently acid nor is the concentration of ammonium cations high enough to effect efficient removal of multivalent cations from the resin and therefore, the elutant passing through pipe 124 under the action of pump 126 is fortified to a predetermined level with anhydrous ammonia from a suitable source through pipe 357 upon opening of control valve 358 and by the same token, required amounts of sulfur dioxide are passed into pipe 124 through line 360 upon selective opening of valve 362 to a predetermined extent. Regeneration of the ion exchange resin within column A3 is continued until substantially all of the multivalent cations are removed from the resin. Although multivalent cations are preferentially absorbed on ion exchange resins because of their high valency, it has been found that ammonium bisulfite within a predetermined pH range is a highly efficient multivalent cation elutant because of the high degree of ionization of the bisulfite solution and also the large quantity of monovalent cations present, such as ammonia, which replace the multivalent cations initially absorbed onto the ion exchange resin.

The calcium bisulfite and ammonium bisulfite as well as other multivalent bisulfites contained in storage tank 92 are pumped into steam stripper 98 under the action of pump 94 and through line 96, whereupon the liquid within stripper 98 is subjected to steam introduced through line 99 leading from a suitable source of such steam at a predetermined temperature.

In this respect it has been found that multivalent cations may be readily precipitated from the regenerant effluent by removing sulfur dioxide from the solution, thereby converting the soluble multivalent bisulfites into sparingly soluble sulfites. The precipitated sulfites may be removed by any of the well known separation methods such as settling, filtration or centrifugation, and the process illustrated utilizes a filter 338 connected to conduit 340 leading from steam stripper 98. The substantially insoluble multivalent sulfites are directed to a suitable chemical recovery plant through line 342, while the remaining ammonium sulfide solution is directed into holding tank 344 via line 346. As illustrated, pump 350 in line 348 serves to force the ammonium sulfite solution from tank 344 into holding tank 122 for reuse in the cyclic system after suitable fortification with ammonia and sulfur dioxide.

Tests have shown that substantially all of the calcium and a commercially practicable proportion of the other multivalent cations are precipitated from the solution passing into steam stripper 98 when such solution is adjusted to a suitable pH, as for example about 5.4, by virtue of the steam introduced through line 99. It is manifest that the pH of the solution containing the multivalent bisulfites may be adjusted to the preferred pH by various processes including boiling the liquid, by introduction of suitable reactive reagents, or by a combination of these methods. Dilution of the liquor should be avoided in order to prevent, insofar as possible, any decrease in the efficiency of precipitation of multivalent cations such as magnesium, iron and manganese, since these sulfites are somewhat more soluble than the sulfite of calcium. If desired, the solution containing the multivalent cations may be partially evaporated to effect a more complete removal of all multivalent sulfites. The sulfur dioxide which has been stripped from the ammonium bisulfite-calcium bisulfite effluent in an operation of the type described above may then be returned to the acid system of the plant via line 91 for reuse in carrying out the present monovalent cation recovery process or preferably directed into line 360 through pipe 95 to refortify the ammonium bisulfite regenerant passing through pipe 124 from tank 122.

Upon substantially complete regeneration of the ion exchange resin in column A3 with the strong ammonium bisulfite solution, valve 134 is closed and valves 55 and 64 are again opened to cause fresh water from line 54 to be passed through exchange column A3 via cross-pipe 60, header 24, column A3, and header 30. Valve 84 is left open to permit not only the quantity of multivalent bisulfites and ammonium bisulfite solution remaining in column A3 to be directed into storage tank 92, but also a predetermined quantity of wash water downflow through column A3.

As soon as the resin in column A3 has been washed sufficiently downflow, valve 55 is closed and substantially simultaneously therewith, valves 68, 70 and 190 are opened to cause the water from fresh water supply line 54 to be directed into the lower end of column A3 through line 66 and header 30 for backwashing the ion exchange resin contained in the column. During backwashing of column A3, valves 64 and 190 are in an open position to permit the wash water to pass outwardly from column A3 through header 24, cross-pipe 60 and pipe 54 to wash water line 188 for passage to the sewer. After reclassification of the resin in column A3 and removal of foreign materials collected at the upper end of the bed, valves 68, 70, 64 and 190 are closed whereby passage of wash water through column A3 ceases and leaves the latter filled with water.

The next step in the operation of the "A" system of apparatus 12 consists of removing column A1 from the loading cycle upon saturation of the same as indicated by the point at which the concentration of multivalent cations effluent therefrom approaches that of the multivalent cations contained in the waste sulfite liquor passing into the same, the waste sulfite liquor then being subsequently directed successively through columns A2 and A3. It is to be noted that column A3 has been freshly regenerated while column A2 previously was placed in the second position behind column A1 to preferentially absorb any multivalent cations leaking from ion exchange column A1. Operation of pump 18 is interrupted momentarily while all of the valves 32, 38 and 40 are maintained in a closed position to prevent waste sulfite liquor from being directed into any of the columns A1, A2 or A3. During this short period, valves 55, 56, 44 and 112 are opened for a time sufficient only to permit water from line 54 to displace the waste sulfite liquor contained in column A1 into column A2. Thereupon, valves 55, 56, 44 and 112 are closed while valves 40, 48 and 70 and 356 are opened to permit flow of waste sulfite liquor from tank 10 through pipe 16, branch 36, header 22, column A2, header 28, conduit 46, header 24 and into column A3. This flow path is maintained only until the wash water within column A3 has been displaced via header 30, line 66, pipe 354 and wash water line 188 leading to wash water surge tank 192. Upon purging of wash water from column A3, valves 70 and 356 are closed and valve 114 opened to cause the ammonium lignosulfonate effluent from column A3 to pass into surge tank 152 through header 30, branch 108 and drain line 100.

The ion exchange resin in column A1 is next regenerated by operation of pump 126 in conjunction with opening of valves 125, 74, 356, 358 and 362 whereby regenerant solution from tank 122 and suitably fortified with sulfur dioxide and ammonia introduced through line 360 and pipe 357 respectively, is directed through pipe 124 and then into column A1 via header 20. The wash water retained in column A1 from the washing step described above is purged from the same by the bisulfite regenerant whereupon valves 74 and 356 are closed and valve 82 is opened to permit the ammonium bisulfite effluent containing multivalent bisulfites from column A1 to be directed into storage tank 92 through header 26, by-pass conduit 80 and pipe 90. After interchange of substantially all of the multivalent cations contained on the resin in column A1 for monovalent cations such as ammonium in the ammonium bisulfite regenerant from holding tank 122, operation of pump 126 is interrupted and valve 125 is closed while washing of the resin in exchange column A1 is accomplished by initially opening valves 55 and 56 to permit water from supply line 54 to pass through open valve 55 into header 20 and then subsequently, through exchange column A1. Valve 82 is kept open until substantially all of the effluent containing multivalent bisulfite materials is discharged from column A1 and thereby directed into tank 92. Upon completion of the washing cycle downflow, the exchange resin in column A1 is backwashed to remove all foreign materials and dirt and to reclassify such resin by closing valve 55 followed by opening of valves 68, 74 and 190 to permit the wash water to flow through line 66, branch line 72 and header 26 into the lower end of column A1. The water flows out of column A1 through header 20, line 54, and wash water line 188 directly into the sewer (not shown). The ion exchange resin in column A1 has now been completely regenerated and washed and is ready to be placed in the loading cycle behind a partially loaded exchange column.

Therefore, when the resin in column A2 is substantially loaded with multivalent cations as indicated by substantial equalization of the multivalent cation concentration in the waste sulfite liquor passing into column A2 with the multivalent cation concentration in the ammonium lignosulfonate effluent therefrom, operation of pump 18 is discontinued for a short period with all of the valves 32, 38 and 40 being closed, and valves 55 and 62 are opened for an instant to cause water from line 54 and passing into column A2 through cross-pipe 58 and header 22, to purge the waste sulfite liquor from column A2. The next step involves operation of pump 18 and closing of valves 38, 44 and 112 while valves 32 and 52 are opened to effect flow of the sulfite liquor successively through exchange columns A3 and A1 in a manner previously defined, this completing one cycle of multivalent cation loading of the ion exchange resins. During loading of the resins in columns A3 and A1 with multivalent cations, the resin in column A2, substantially fully loaded with multivalent cations, is regenerated by opening of valves 132, 78, 356, 357 and 360 to permit regenerant from holding tank 122 to flow through pipe 124 under the action of pump 126 whereby the same is fortified with additional quantities of ammonia and sulfur dioxide from pipe 360 and line 357 and then directed through by-pass branch 128 into header 22 for flow into the upper end of exchange column A2. After displacement of the wash water from column A2 by the ammonium bisulfite regenerant, valves 78 and 356 are closed while valve 88 is opened to cause the multivalent sulfite effluent from column A2 to be directed into storage tank 92 via header 28, line 86 and pipe 90.

In the description of operation of the "B" system of apparatus 12, it is assumed that at least one cycle has been completed and therefore, the ion exchange resin in column B4 is partially loaded with monovalent cations such as ammonium, from a preceding operational step while the ion exchange resin in column B1 has been regenerated with a sulfurous acid solution to thereby place hydrogen ions on the resin. During the loading operation of columns B4 and B1, to be hereinafter defined, columns B2 and B3 are being regenerated with a solution of sulfur dioxide according to a process to be more fully explained.

In order to obtain maximum removal of the monovalent cations contained in the ammonium lignosulfonate effluent passing from the "A" system of apparatus 12 into surge tank 152, the monovalent containing lignosulfonate is directed successively through a pair of ion exchange columns, with the solution being initially directed through a column partially loaded with monovalent cations in a prior operation and then subsequently through a freshly regenerated resin. Thus, it is to be noted that valve 158 is in a normally open condition, while pump 156 is intermittently operated to direct ammonium lignosulfonate from surge tank 152 through conduit 154 to headers 136, 138, 140 and 142. During the initial phase of the operating cycle, valve 155 controlling flow of liquid from conduit 154 into header 142 is open to permit the monovalent cation containing lignosulfonate to flow into the uppermost end of partially monovalent loaded exchange column B4 during actuation of pump 156 and also, valves 186 and 242 are open whereby the effluent from the lower end of exchange column B4 flows through header 150, cross-line 184, header 136, thence through freshly regenerated exchange column B1, and header 144 into line 238. Because the resin in column B1 has just been washed with water following regeneration of the same with sulfurous acid, the flow path just described is continued until all of the water contained in ion exchange column B1 is purged therefrom via line 238, cross-pipe 252, line 194, and by-pass line 200 into wash water surge tank 192. The wash water from column B1 flows into surge tank 192 by virtue of the fact that valve 202 is open during this period while valve 196 remains in a normally open position. Immediately upon removal of all wash water from column B1, valves 242 and 202 are closed while valve 264 is opened to cause the ligninsulfonic acid effluent from exchange column B1 to flow into ligninsulfonic acid solution storage tank 254 via header pipe 259 and conduit 256.

Successive flow of the ammonium lignosulfonate through exchange columns B4 and B1 is continued until the concentration of monovalent cations within the effluent from the lower end of column B4 through header 150 approaches that of the concentration of monovalent cations in the lignosulfonate influent flowing into the upper end of column B4 through header 142. Upon substantially complete loading of the ion exchange resin in column B4 with monovalent cations such as ammonium, valve 155 is closed, while operation of pump 156 is briefly interrupted and pump 204 actuated in conjunction with opening of valves 198, 196 and 214 to effect flow of wash water from tank 192 into the upper end of column B4 via line 194 and conduit 208. This flow path is maintained only for a time sufficient to permit the wash water to purge the ammonium lignosulfonate from column B4 into column B1 whereupon operation of pump 204 is discontinued and valves 198, 214, 186 and 264 are closed. Valves 166, 174, 250 and 202 are next opened with valve 196 remaining open to effect successive flow of the ammonium lignosulfonate through exchange columns B1 and B2 via by-pass line 160, header 136, exchange column B1, header 144, cross-line 172, header 138, column B2, header 146, and conduit 246 into line 238 for passage to wash water surge tank 192 via cross-pipe 252, line 194 and by-pass line 200. As noted with respect to flow through columns B4 and B1, the lower end of column B2 is connected with wash water surge tank 192 until all of the water remaining therein from a prior washing operation has been purged from the column. Thereupon, valves 250 and 202 are closed while valve 266 is opened to divert the flow from column B2 into ligninsulfonic acid solution storage tank 254 through header pipe 260 and conduit 256.

Although the greatest proportion of monovalent cations are preferentially interchanged for hydrogen ions on the first ion exchange resin into which the monovalent cations come into contact, it has been found that a certain ratio of such monovalent ions leak from the first column through which the monovalent cation containing lignosulfonate is directed and therefore, those monovalent cations which leak from the first resin are preferentially absorbed by the resin in the next successive column. Thus, the monovalent cations which leaked from exchange column B4 during the first step of operation described above are preferentially interchanged for hydrogen ions on the resin in column B1 and substantially complete removal of monovalent cations is effected from the lignosulfonate effluent passing into storage tank 254. Similarly, when the monovalent lignosulfonate solution from tank 152 is passed successively through columns B1 and B2 as defined, the liquor is initially directed through a resin which has been partially loaded with monovalent cations in a prior step, while the monovalent cations leaking with the effluent from column B1 are preferentially absorbed on the freshly regenerated resin contained in column B2.

Upon indication of saturation of the ion exchange resin in column B1 with monovalent cations, this state being evidenced by substantial equilibrium between the concentration of monovalent cations in the lignosulfonate effluent from the lower end of column B1 with the concentration of monovalent cations in the lignosulfonate influent into the upper end of such column, flow of monovalent lignosulfonate successively through columns B1 and B2 is discontinued by cessation of operation of pump 156 and closing of valve 166. Pump 204 is actuated and valves 198 and 195 are opened whereby wash water pumped from tank 192 and flowing into the upper end of column B1 through line 194 and header 136, displaces the lignosulfonate fraction remaining in column B1. After displacement of the lignosulfonate solution from column B1, valves 198 and 195 are closed and valves 168, 178, 248 and 202 opened. In this manner, the flow of ammonium lignosulfonate is diverted from columns B1 and B2 and thereby, successively directed through columns B2 and B3 via conduit 154, by-pass line 162, header 138, column B2, header 146, cross-line 176, header 140, column B3, header 148, and conduit 244 into cross-pipe 252 for conveyance into surge tank 192 through line 194 and by-pass line 200. As soon as the wash water initially contained in column B3 is purged therefrom through header 148 and conduit 244, valves 248 and 202 are closed and valve 268 is opened to cause the ligninsulfonic acid effluent from column B3 to be introduced into storage tank 254 through header pipe 262 and conduit 256.

Again, this flow pattern successively through columns B2 and B3 is continued until the resin in column B2 is substantially loaded with monovalent cations preferentially interchanged for hydrogen ions therein, as indicated by substantial equalization of the quantity of monovalent cations in the effluent from column B2 with the monovalent cations in the influent thereinto. When this equilibrium condition is reached, flow of the liquor to column B2 is discontinued by discontinuance of operation of pump 156 and closing of valve 168 as well as substantially simultaneous opening of valves 198 and 205 in conjunction with operation of pump 204 to thereby cause sufficient wash water from tank 192 to be directed into column B2 along a path described above to header 138, to purge the ammonium lignosulfonate therefrom. The purging procedure is followed by stopping of pump 204 and closing of valves 198, 205, 178 and 268 as well as opening of valves 170, 182, 240 and 202 to thereby direct the monovalent containing lignosulfonate solution successively through columns B3 and B4 via conduit 154, by-pass line 164, header 140, exchange column B3, header 148, cross-line 180, header 142, exchange column B4, header 150, and thence through line 236 into by-pass line 252 and finally, into surge tank 192 via line 194 and by-pass line 200. However, as soon as the wash water has been displaced from exchange column B4, valve 240 is closed and valve 258 opened to permit the ligninsulfonic acid effluent to pass into tank 254 through conduit 256. As soon as the resin in exchange column B3 is substantially loaded with monovalent cations, pump 204 is started and valve 170 is closed while valves 198 and 212 are opened to permit wash water from tank 192 via line 194 and header 140 to displace the ammonium lignosulfonate from column B3. Subsequently, valves 198 and 212 are closed and valves 155, 186 and 242 are opened to again place columns B4 and B1 in series in a manner hereinabove described.

During loading of a pair of the exchange columns B1, B2, B3 or B4 with monovalent cations, the other pair of exchange columns are being regenerated with sulfurous acid to thereby produce a quantity of unfortified ammonium bisulfite pulping liquor. Correlating the description of the regeneration of columns B1, B2, B3 and B4 with the loading operation previously set forth, it is to be noted that during successive passage of ammonium lignosulfonate from surge tank 152 successively through ion exchange columns B4 and B1, columns B2 and B3 are being simultaneously regenerated with a solution of sulfurous acid obtained from the acid plant of the mill. In order to assure the most efficient elution of monovalent cations preferentially absorbed on the exchange resins in columns B1, B2, B3 and B4, the sulfurous acid regenerant is successively passed through a pair of columns, the first of which has been partially regenerated during a prior step. Therefore, assuming that column B2 has been partially regenerated while column B3 is substantially loaded with monovalent cations, sulfurous acid from recycle surge tank 292 is initially directed through line 310 upon operation of pump 312 and opening of valve 314 into pipe 311 for direction into header 138 and partially loaded exchange column B2 as valves 248 and 202 are opened to permit flow of liquid therethrough. At the same time, valves 178 and 268 are opened to cause the recycle sulfurous acid solution contained in tank 292 to be directed from the lower end of exchange column B2 through header 146, cross-line 176, header 140 and then into exchange column B3. Inasmuch as water remains in column B3 from the prior washing step outlined above, such water is purged from column B3 by the recycle sulfurous acid regenerant passing into the same, with the wash water being directed into surge tank 192 via header 148, conduit 244, line 238, cross-pipe 252, line 194 and by-pass line 200. After displacement of the water from column B3, valves 202 and 248 are closed while valve 328 is opened to cause the unfortified ammonium bisulfite cooking liquor emanating from the lower end of column B3 to pass into storage tank 120 via header 148, cross-pipe 324, line 318 and pipe 316. As hereinbefore indicated and as to be described more fully later, the sulfurous acid solution directed successively through exchange columns B2 and B3 substantially removes the monovalent cations from the resins contained therein and interchange is effected between the hydrogen ions of the sulfurous acid solution for monovalent cations on the resin.

Passage of recycle sulfurous acid solution from surge tank 292 successively through exchange columns B2 and B3 is continued until a suitable proportion of the effluent from the previous sulfur dioxide regeneration cycle has been directed through the latter, and preferably constituting one-half of the total volume of sulfur dioxide obtained from the acid plant and used in one regeneration cycle. Although the sulfurous acid regeneration procedure may be varied, the best regeneration of the B column resins has been obtained by passing 3/2 parts of the sulfurous acid solution available for regeneration purposes through the resins. This is accomplished by collecting the last one-half of the quantity of sulfurous acid utilized for each regeneration, in surge tank 292 and then recycling this one-half fraction of solution over successive resins during the next regeneration stage and in conjunction with the total volume of sulfurous acid employed in the subsequent regeneration, with the recycle sulfurous acid being passed successively over the next resins as the initial regenerating medium. Therefore, operation of pump 312 is discontinued and valves 314 and 311 are closed while valve 288 is opened to permit sulfurous acid solution to flow from the acid plant through acid conduit 276 into header 138 via line 282 for subsequent flow through columns B2 and B3 after a designated quantity of recycle sulfurous acid solution from surge tank 292 has been recycled over the resins in columns B2 and B3. Upon passage of approximately one-half of the fresh sulfurous acid solution from line 276 through the exchange resin in column B3, valve 328 is closed and valve 296 is opened to permit the effluent from column B3 to pass into the recycle surge tank 292 via conduit 294. In this manner, it can be seen that the first portion of the effluent from column B3 and comprising a relatively strong ammonium bisulfite solution is directed into unfortified raw cooking liquor storage tank 120 while the remaining fraction of the effluent from column B3 and consisting of a relatively minor amount of ammonium bisulfite in a strong solution of sulfurous acid is permitted to flow into surge tank 292 and which is utilized in subsequent regeneration cycles.

It is recognized that the quantity of sulfurous acid available for regeneration purposes, and which is produced by the acid plant of the pulping installation, is necessarily limited to that volume of ammonium bisulfite solution required for charging the digesters. Thus the relative concentration of the ammonium bisulfite cooking liquor may be increased by suitable fortification procedures, but the volume of such liquor utilized in each digestion is limited to a predetermined variable parameter dependent primarily on the quantity of water in the wood and which necessarily varies from species to species as well as according to the season in which the wood was cut. Furthermore, steam must be introduced into the digester to raise the contents thereof to a selected level and this again results in additional water being introduced into the digestion unit and which additionally limits the amount of cooking liquor which can be added to the digestor for each pulping operation. For these reasons, it is essential that maximum regenerating action be obtained from the sulfurous acid solution in removal of monovalent cations from the B column resins, notwithstanding the fact that approximately 20% of the waste sulfite liquor cannot be recovered from the pulp without special washing equipment and which permits utilization of a somewhat greater amount of ammonium bisulfite solution than would be the case if no product loss occurred.

The next step in regeneration of columns B2 and B3 involves closing valve 168 and operating pump 204 while opening valves 198 and 210 for a time sufficient only to permit pump 204 to force wash water from surge tank 192 through line 194, conduit 205, header 138 and into column B2 and thereby displace the sulfurous acid regenerant from column B2 into column B3, the initial quantity of regenerant in column B3 passing into recycle surge tank 292 via header 146, cross-line 176, header 140, exchange column B3, header 148 and conduit 294. Next, pump 204 is stopped and valves 198, 210, 178 and 296 are closed while valves 232, 210 and 202 are opened to backwash and reclassify the resin in column B2 as fresh water flows from line 54 through wash water line 220, pipe 226, header 146, column B2, header 138, conduit 205, line 194 and by-pass line 200 into wash water surge tank 192.

It can now be ascertained that exchange column B2 has been regenerated and is substantially in the hydrogen form for placement in cycle behind column B1 in a manner previously described. By the same token, elution of monovalent cations from the resin in column B3 has been partially completed and columns B3 and B4 are placed in series relationship for regeneration in a manner similar to that referred to heretofore with respect to columns B2 and B3. Inasmuch as column B4 is filled with water from the prior washing step described above and is in communication with column B1 during this operation through cross-line 184, valve 186 is closed and valves 314, 319, 182, 240 and 202 opened in conjunction with operation of pump 314 to cause the recycle sulfurous acid solution from tank 292 to be directed through line 310 into pipe 313 whereby the water within column B4 is displaced therefrom. Upon purging of wash water from column B4, valve 240 is closed while valve 323 is opened to cause the effluent product from column B4 to be conveyed into unfortified ammonium bisulfite raw cooking solution storage tank 120 through pipe 316. Upon passage of the recycle sulfurous acid solution through, successively, columns B3 and B4, pump 312 is stopped and valves 314 and 319 are closed while valve 290 is opened to cause sulfurous acid solution from the acid plant to pass successively through columns B3 and B4 via conduit 276, acid line 284, header 140, column B3, header 148, cross-line 180, header 142, column B4, header 150 and pipe 316 into tank 120. After passage of a predetermined volume of sulfurous acid regenerant through columns B3 and B4 and into tank 120, valve 323 is closed and valve 300 is opened to permit the remainder of the regenerant effluent from exchange column B4 to pass into recycle surge tank 292 through line 298 and conduit 294. At the end of the regeneration cycle, valve 290 is closed and valves 198 and 212 are opened as pump 204 is actuated to effect direction of a sufficient volume of wash water from surge tank 192 into column B3 via line 194 and conduit 206 to thereby cause the regenerant initially contained in column B3 to be purged from the latter and directed into column B4 by way of cross-line 180. The sulfurous acid regenerant in column B4 flows through header 150 and line 298 into conduit 294 for passage into surge tank 292. Fresh water backwash and reclassification of exchange column B3 is next provided upon closing of valves 198, 182 and 300 followed by opening of valves 234 and 202, whereby the fresh water from line 54 flows through wash water line 220 into pipe 228 and thence through header 148, exchange column B3, header 140, conduit 206, line 194 and by-pass line 200 into tank 192.

Following substantially full regeneration of exchange column B3 and partial elution of monovalent cations from the resin in column B4, the latter and exchange column B1 are placed in series elution relationship to thereby effect regeneration of column B4 and partial removal of monovalent cations from column B1. Such elution of monovalent cations is accomplished by operating pump 312 and initially opening valves 314, 321, 186, 242 and 202 to cause recycle sulfurous acid solution from surge tank 292 to be directed through line 310 by pump 312 into conduit 208 for passage into column B4 via header 142 and then subsequently, from the lower end of such conduit through header 150, cross-line 184, header 136 and into the upper end of exchange column B1, the valve position arrangement set forth immediately above being continued only until the wash water within column B1 has been purged therefrom by the recycle sulfurous acid solution and thereby directed into wash water surge tank 192 via line 238, cross-pipe 252, line 194 and by-pass line 200. When the wash water has been displaced from column B1, valve 242 is closed and valve 320 is opened to divert the flow of effluent from column B1 into storage tank 120 via line 318 and pipe 316. Regeneration with recycle solution from surge tank 292 is carried out as outlined above and then pump 312 is stopped and valves 314 and 321 are closed while valve 278 is opened to cut off the flow of recycle solution from surge tank 292, exchange being made therefor with fresh sulfurous acid regenerant solution from conduit 276 being directed into header 142 and then subsequently into exchange column B4. Passage of sulfurous acid solution through conduit 276 is continued until a predetermined quantity of the acid has been directed through the columns whereupon valve 320 is closed and valve 304 opened to divert the flow of effluent from the lower end of column B1 into recycle solution surge tank 292 through line 302 and conduit 294. The next sequential step involves washing the resin in column B4 with water from surge tank 192 whereby valve 278 is closed while pump 204 is actuated and valves 198 and 214 are opened to permit wash water from surge tank 192 to be forced through line 194 into conduit 208 for passage through header 142 into exchange column B4, the sulfurous acid regenerant purged from column B4 passing through header 150, cross-line 184, header 136 and into exchange column B1 whereby the regenerant initially contained in column B1 passes through header 144, line 302 and conduit 294 into recycle surge tank 292. Upon completion of displacement of sulfurous acid from column B4 in the described washing cycle, pump 204 is stopped and valve 198 is closed along with valves 186 and 304. Upflow wash of the resin in ion exchange column B4 to reclassify the same is carried out by opening valve 222 to cause fresh water from line 54 to pass into exchange column B4 at the lower end thereof via wash water line 220 and header 150, while the wash water effluent from exchange column B4 passes through header 142 into conduit 208 for passage to surge tank 192 through line 194 and by-pass line 200.

The final regeneration operation of one complete cycle of the "B" system involves placement of exchange columns B1 and B2 in series relationship for elution purposes. Thus, pump 312 is operated and initially valves 314 and 309 are opened, as well as valves 174 and 250, whereby recycle solution from surge tank 292 passes through line 310 into header 136, and then subsequently into exchange column B1, the sulfurous acid solution remaining in column B1 from the prior regeneration operation passes into column B2 via header 144, crossline 172 and header 138, whereby the water contained within column B2 passes through header 146, conduit 246, line 238, cross-pipe 252, line 194, by-pass line 200 and into surge tank 192. Upon displacement of the wash water from column B2, valve 250 is closed and valve 326 is opened whereby the effluent from column B2 passes from header 146 into product storage tank 120 through cross-pipe 322, line 318 and pipe 316. After direction of the recycle solution from surge tank 292 successively through exchange columns B1 and B2, pump 312 is stopped and valves 314 and 309 are closed while valve 286 is opened to cause a predetermined quantity of sulfurous acid from the acid plant to pass directly into exchange column B1 through acid line 276, line 280 and header 136. Passage of a selected fraction of the fresh sulfurous acid regenerant from line 276 through the ion exchange resin in column B1 is followed by closing of valve 326 and opening of valve 308 to permit the last fraction of the sulfurous acid regenerant to flow from the lower end of column B2 to recycle surge tank 292 via branch line 306, line 302 and conduit 294. Next, valve 286 is closed and valves 198 and 195 are opened in conjunction with operation of pump 204 whereby wash water from tank 192 is forced through line 194, header 136 and thence into exchange column B1, the sulfurous acid displaced from column B1 into column B2 causing the regenerant in the latter to flow into surge tank 292 via branch line 306, line 302 and conduit 294. Sufficient water is forced into column B1 only to displace the sulfurous acid regenerant therefrom.

Reclassification and backwashing of exchange column B1 is carried out by stopping pump 204 and closing of valves 198, 174 and 202 substantially simultaneously with opening of valve 230, whereby the fresh water from line 54 passes through wash water line 220 into header 144 via pipe 224 for upflow through exchange column B1 into line 194. By-pass line 200 serves to direct the water from line 194 into wash water surge tank 192. This completes the cycle of operation of apparatus 12 throughout one complete cyclic process. It is, however, to be pointed out that the ligninsulfonic acid solution from storage tank 254 may be directed to a suitable chemical recovery and/or burner station through line 270 by virtue of pump 272.

Drain line 101 and its associated drain by-pass pipes 105 and 107 are provided to permit return of waste sulfite liquor to surge tank 10 when desired and particularly when it is necessary to perform maintenance or similar work on one of the exchange columns of the A series and a quantity of waste liquor is contained within the particular column upon which repair or the like is needed.

The various equilibrium states referred to previously can be detected by changes in pH of the different solutions and it is manifest that several conventional procedures may be employed to detect the change.

The regenerant utilized in removing multivalent cations from the resins in the A columns and constituting a relatively strong ammonium bisulfite solution is preferably made up of a predetermined proportion of the ammonium sulfite emanating from filter 338 and comprising a product of the steam stripping operation within stripper 98, in conjunction with a sufficient quantity of raw cooking liquor from storage tank 120 to make up the necessary volume for regeneration of one of the A columns, and which admixture is then suitably fortified with additional ammonia and sulfur dioxide through pipe 357 and line 360 respectively to bring the ammonium bisulfite regenerant up to the required concentration. Tests have shown that the most advantageous results are obtained when about 40% of the ammonium sulfite collected in tank 344 is directed into holding tank 122 while the remaining proportional quantity of solution is conveyed to storage tank 120 via by-pass conduit 352. In order to balance the volume of ammonium sulfite by-passed from tank 344 to tank 120 rather than into holding tank 122, an amount of unfortified raw cooking liquor collected in tank 120 and equal to the volume of ammonium sulfite conveyed from tank 344 to tank 120, is directed from tank 120 to holding tank 122 via elutant line 116, thereby maintaining the necessary volume of regenerant in tank 122 for passage to one of the A columns after fortification in the manner outlined.

The utilization of a quantity of unfortified raw cooking liquor from storage tank 120 in the preparation of the A column regenerant is of importance because this procedure prevents the slow build-up of multivalent cations in the ammonium bisulfite regenerant which would occur if a closed regenerant system were utilized. Although substantially all of the multivalent cations in the effluent directed into storage tank 92 from the A columns are removed by steam stripper 98, it can be appreciated that a relatively small quantity of multivalent cations will be carried over to tank 344 and the system described permits establishment of an equilibrium condition without build-up of multivalent cations in the ammonium bisulfite regenerant to a point where the regenerating action of the solution would be impeded.

Furthermore, since a portion of the unfortified cooking liquor is added to the solution in tank 122 to make up the necessary volume, introduction of additional quantities of water into the system is precluded.

It is also to be understood that the raw cooking liquor collected in storage tank 120 is fortified with ammonia and sulfurous acid to raise the concentration of ammonium bisulfite to the required level prior to passage of the cooking liquor to the pulping digesters.

It has been found that the utilization of ammonium bisulfite as a regenerating solution for removing divalent cations such as calcium, magnesium, iron and manganese from the resins in columns A1, A2 and A3 subsequent to loading of the same in a manner as described above, is advantageous for several reasons including (1) the use of ammonium bisulfite does not introduce any extraneous chemicals into the recovery system which would need subsequent operations to remove the same; (2) the chemicals employed in the system are available at the mill under present procedures and are the specific ones actually used in the pulping process; (3) ammonium bisulfite is highly soluble in water and a solution thereof is more highly dissociated than sulfurous acid and it is therefore a much more efficient regenerating agent; (4) calcium sulfite, a useful chemical, is recovered as a by-product of the regeneration process; (5) the contaminating divalent cations such as calcium, magnesium, iron and manganese can be easily and effectively rejected from the system by a simple process of precipitation involving the removal of sulfur dioxide from the ammonium bisulfite effluent by utilization of a steam stripper; (6) both ammonia and sulfur dioxide, used in the preparation of the ammonium bisulfite regenerant, are recovered and reused in the process, the only loss whatsoever being the small amount of sulfur dioxide combined with the precipitated multivalent cations; (7) the ammonium sulfide solution obtained after precipitation of a substantial part of the multivalent cations therefrom in a manner described above, may alternately be recycled as the regenerant after suitable fortification or diverted in whole or in part to reinforce the ammonium bisulfite solution directed to the pulping digesters; (8) the system utilizes conventional equipment and does not require elaborate, strong and resistant apparatus; and (9) removal of multivalent cations from the system may be accomplished easily and economically by virtue of the fact that monovalent and multivalent cation bisulfites as well as monovalent sulfites are soluble materials whereas multivalent sulfites are much less soluble, permitting percipitation of the unwanted constituents by merely adjusting the pH of the solution as, for example, by removal of sulfur dioxide.

As an example of the preferred regenerant used for elution of the multivalent cations preferentially absorbed on a designated resin in the columns A1, A2 or A3, a solution of ammonium bisulfite containing approximately 40 grams/liter of ammonia and 130 grams/liter sulfur dioxide has been found to be satisfactory. This solution, which has a pH of approximately 3.5, gives the most satisfactory results at a commercially attractive cost but it is not intended to limit the concentration or pH of the multivalent eluting solution to these values. The upper limit would be a saturated solution of ammonium bisulfite, for example one containing at 25° C., approximately 189 grams/liter of ammonia, 721 grams/liter of sulfur dioxide and having a pH of 3.2. Although the lower limit will vary with operating conditions, a solution having less than 5 grams/liter of ammonia is relatively ineffective as a regenerating medium. It has been found, however, that the most favorable multivalent cation regenerant solution should have from 5 to 100 grams/liter of ammonia and a pH within the range of 3.0 to 4.5 in order to give the most efficient results. It is essential to maintain sufficient sulfur dioxide in the ammonium bisulfite regenerant to assure that multivalent cations are not precipitated on the resins in the columns as insoluble sulfites.

If the concentration of the ammonium bisulfite regenerant is less than that stipulated above, then the volume of solution required for adequate regeneration becomes excessively large, and the efficiency of the subsequent precipitation of the multivalent sulfite salts is reduced. If, on the other hand, the higher concentrations of regenerant are used, premature precipitation of the sulfites might be effected in the regenerant effluent from the column. This condition obviously would give rise to operating difficulties.

For the removal of monovalent cations such as ammonia, sodium or potassium adsorbed on the B column resins during the loading cycles, a solution of sulfur dioxide in water produced at the acid plant of the paper mill and directed to apparatus 12 via sulfurous acid conduit 276, preferably contains about 60 to approximately 140 grams of sulfur dioxide per liter of the total liquid, calculated at a temperature of 25° C. to 5° C. However, the preferred sulfurous acid regenerant is a substantially saturated solution at the operating temperature of the regeneration procedure although it is to be pointed out that the concentration specified above, as well as the temperature of the sulfurous acid solution, may be varied and in this connection, either a reduction in such temperature or an increase in sulfur dioxide concentration will improve the efficiency of regeneration. However, within the practical aspects of the present invention, it is apparent that various modifications of the concentrations and temperature of the solution may be made without departing from the spirit of this disclosure.

Since the regeneration cycle of the monovalent cation column B1, B2, B3 or B4 is carried out by passing the sulfurous acid regenerant solution through two monovalent loaded columns in series, the first of which has been partially regenerated in a previous regeneration cycle and the second being fully loaded with respect to monovalent cations, a two-stage co-current regeneration is provided. The effluent from the second column consists of a solution of sulfurous acid containing the monovalent cations eluted from the resin in the column and such ammonium bisulfite is in condition for utilization in subsequent pulping operations.

In this respect it is to be noted that under certain operating conditions, more efficient regeneration may be obtained by dividing the sulfurous acid-ammonium bisulfite effluent passing from the second column being regenerated with the first fraction which is relatively high in ammonium bisulfite being sent directly to the cooking liquor storage, while the second portion is directed into recycle surge tank 292 for subsequent use as the preliminary regeneration solution in the next elution cycle. This process has been outlined in detail with respect to the description of the operation of the "B" system of apparatus 12. It is manifest, however, that whichever of the above processes is used, the sulfurous acid-ammonium bisulfite effluent directed into storage tank 120 will require some adjustment of the ammonia and sulfur dioxide concentration before the same can serve as a sulfite cooking liquor for the manufacture of wood pulp.

Although the description thus far has been primarily concerned with the recovery of ammonia from waste sulfite pulping liquors, it can be perceived that the process is equally applicable for the efficient recovery of other types of monovalent base cations used in the preparation of wood pulp, since potassium and sodium cations can be preferentially exchanged on ion exchange resins with the same facility as described with respect to ammonium cations. By the same token, potassium and sodium cations derived from the wood and process water during digestion are recovered in the present cyclic operation, and the presence of these additional monovalent base cations may be considered as a partial replacement for the normal ammonia make-up utilized in the preparation of fresh cooking liquor, thereby materially increasing the efficiency of the process. The increase of monovalent cations attributable to potassium and sodium ions in the wood and process water may amount to as much as 3.5% of the total monovalent base required in the pulping process.

As indicated during the operational description, washing and draining of the beds is employed between the various loading and regeneration cycles to redistribute and reclassify the resins, as well as remove foreign particles from the beds. Although certain designated washing procedures have been described in detail, it can be appreciated that the arrangement of washing steps may be changed to satisfy different conditions of operation. For example, with reference to the cyclic operation of the "A" system of apparatus 12, it is to be noted that the following alternative loading elution and washing steps may be practiced with satisfactory results:

PROCEDURE A (1) Multivalent cation loading of ion exchange resin downflow;
(2) Upon completion of loading cycle, ammonium bisulfite regenerant directed through resin bed downflow;
(3) Wash water downflow after cessation of passage of ammonium bisulfite regenerant;
(4) Subsequently wash bed with water upflow to redistribute particles of resin, reclassify the same and remove foreign particles from the bed.

PROCEDURE B (1) Multivalent cation loading of resin bed downflow;
(2) Wash water directed downflow through the resin after passage of sulfite liquor through the same;
(3) Subsequently passing ammonium bisulfite regenerant solution downflow through the bed of ion exchange resin;
(4) Then, passing wash water downflow through resin; and
(5) Finally, reclassification, redistribution and contaminating particle removal by passing wash water upflow through resin bed.

PROCEDURE C (1) Multivalent cation loading of resin bed downflow;
(2) Drain resin of waste sulfite liquor;
(3) Pass ammonium bisulfite regenerant through resin bed downflow;
(4) Subsequently direct wash water downflow through exchange resin; and
(5) Then directing wash water upflow through the bed of resin.

PROCEDURE D (1) Multivalent cation loading of ion exchange resin downflow;
(2) Draining waste sulfite liquor from ion exchange resin;
(3) Directing ammonium bisulfite regenerant solution downflow through the exchange bed;
(4) Again drain bed of ammonium bisulfite elutant solution; and
(5) Passing wash water upflow through the bed to reclassify and redistribute the resin as well as remove foreign particles therefrom.

By the same token, different washing procedures may be practiced with respect to the "B" columns which may be the same as any one of the washing operations described above with respect to the "A" beds.

In one pilot scale experiment, substantially following the cyclic process outlined above with respect to apparatus 12, the unit consisted basically of seven jacketed columns 72 in. in length, the three A columns each being 1 in. in diameter and containing 535 grams of "Amberlite IR-120" whereby the bed depth was 54 inches and permitted a 25% bed expansion. The four B columns were 1.9 in. in diameter and contained 1900 grams of the same type of resin and also had the same bed depth as the A columns.

A waste sulfite liquor of the following composition was passed through the pilot unit in accordance with the operating procedure described above with respect to apparatus 12.

Table 1

| | |
|---|---|
| $NH_3$ | gms./liter __ 4.42 |
| CaO | do ____ 0.325 |
| MgO | do ____ 0.067 |
| $Fe_2O_3$ | do ____ 0.016 |
| $MnO_2$ | do ____ 0.029 |
| pH | 2.60 |

When the system was brought to equilibrium as outlined above, it was determined that 30 liters of waste sulfite liquor of the composition set forth in Table 1 was required to fully load an A column after the same had previously been disposed in series relationship as a scavenger bed. With reference to the complete series of operations involving one of the A columns such as A1, it is to be recognized that column A1 is in the ammonium form and has been backwashed. This column was then placed in the second position in series with partially loaded column A3 and the 30 liters of waste sulfite liquor passed through the same at a flow rate of 200 ml./min. The pH of the initial effluent from column A1 was about 2.9, differing from the original pH of the waste liquor because a quantity of the ammonia was eluted from the resin in column A1 by the multivalent cations preferentially absorbed thereon. The lignosulfonate effluent from column A3 was collected for passage through certain of the B column and the column A3 was drained and column A1 placed in series as the first loading column with previously regenerated and backwashed column A3. A second quantity of 30 liters of the described waste sulfite liquor was passed successively through columns A1 and A2 at the stipulated flow rate and with the effluent therefrom again being collected with the effluent from successive passage of waste liquor through columns A3 and A1.

For the regeneration of the resin in column A1, 2.1 liters of ammonium bisulfite solution containing 40 gms. $NH_3$ per liter and 140 gms. $SO_2$ per liter at a pH of approximately 3.5 were passed over the A1 column resin at a flow rate of 200 ml./min. Analyses indicated that approximately 7 gms. of $NH_3$ were absorbed by column A1 during the described cycle.

Following column B1 through one complete cycle, it was determined that approximately 14 liters of the lignosulfonate effluent from the A columns was required to substantially load a partially loaded resin which had previously acted in a scavenger capacity. Thus at the beginning of the cyclic operation, the resin in column B1 was substantially in the hydrogen form and had been suitably backwashed. The stipulated amount of ammonium lignosulfonate was passed successively through previously partially loaded column B4 and then through freshly regenerated column B1 at a 200 ml./min. flow rate, the lignosulfonic acid effluent from column B1 being collected. Next, another 14 liter volume of ammonium lignosulfonate was successively directed through partially loaded column B1 and freshly regenerated column B2 at the designated flow rate and with the lignosulfonic acid effluent being directed into the same holding vessel. Analyses indicated that the lignosulfonic acid effluent contained about 0.78 gm./liter of $NH_3$.

Regeneration of column B4 (which illustrates the process) was effected by initially passing 9.0 liters of recycle $SO_2$ solution successively over partially previously regenerated column B4 and then over fully loaded column B1. A 7% solution of $SO_2$ was then passed over the columns until an effluent volume of 9 liters was collected (ammonium bisulfite in sulfurous acid) and the fresh $SO_2$ solution passage over the resins was continued until another quantity of 7.0 liters of effluent was collected and which was diluted with water sufficient to present 9.0 liters of recycle solution suitable for future regeneration cycles.

Analyses of the collected sulfurous acid effluent indicated that about 2.9 gms./liter of $NH_3$ was recovered from the B column with the total weight of ammonia being approximately 52.25 gms.

Thus, assuming that the ammonia is displaced from the A columns to the B columns at a uniform rate, the weight of ammonia derived from an A column and which is absorbed on a B column in any one B column loading cycle is:

$$\frac{7 \times 14}{30} = 3.26 \text{ gms.}$$

Calculating the $NH_3$ entering the B system:

| | Grams |
|---|---|
| 14 liters of WSL at 4.42 gms./liter | 61.60 |
| and $NH_3$ displaced from A column | 3.26 |
| Total | 64.86 |

The $NH_3$ from the B system is:

| | Grams |
|---|---|
| 14 liters LSA at 0.76 gms./liter | 10.62 |
| and 18 liters $SO_2$ soln. at 2.90 gms./liter | 52.25 |
| Total | 62.87 |

Therefore, the efficiency based on ammonia removed by the $SO_2$ regenerant compared to the ammonia entering the system:

$$\frac{52.25}{64.86} = 80.7\%$$

Note is to be taken of the fact that the ammonia recovery set forth above is equal to approximately 80% of the ammina cations in the waste sulfite liquor from the digesters, whereas the actual total percentage recovery of the system must take into account the quantity of ammonia which may be lost during blow off and similar operations. However, the quantity of ammonia recovered is augmented by the recovery of approximately 3% monovalent cations bases such as sodium and potassium which are introduced into the waste sulfite liquor from the mineral constituents of the wood and process water.

As heretofore noted, the leakage of multivalent ions in the lignosulfonate liquor effluent from the multivalent cation loading columns and which is directed to the monovalent loading columns is at a very low level and an equilibrium condition is reached where build-up of multivalent cations on the monovalent ion exchange resins ceases. Of the small amount of multivalent cations that do continue to leak through into the monovalent beds, a similar portion of the same is eliminated with the lignosulfonic acid effluent while that proportion of multivalent cations which are absorbed on the monovalent cation exchange resins are maintained at a low equilibrium level under the operating conditions outlined with the quantity of multivalent cations leaking onto the B column resins being balanced with the multivalent cations being removed and leaking from such resins. In any event, the quantity of multivalent cations on the B column resins is not sufficiently high to seriously impair the monovalent cation recovery operation. The multivalent cation leakage to the monovalent ion exchange columns therefore, is balanced by the leakage and elution from the columns and the level of multivalent cations in the resin remains low. This permits repeated loading and unloading of the columns with the useful base cations and makes the recovery system economically feasible without discontinuance of the cyclic process and subsequent regeneration of the ion exchange resins with a mineral acid, such as hydrochloric acid. It has been determined in repeated cycles that the final lignosulfonic acid effluent carries approximately 6% of the concentration of multivalent cations in the waste sulfite feed liquor. Furthermore, the concentration of multivalent cations in the ammonium bisulfite effluent from the B columns which can be directed to the pulping digesters is approximately 9%. At these levels and with the losses of pulping liquor in the blow pit, the multivalent cations cannot build up to a point where they can interfere with the recovery operation.

Ammonium bisulfite at a relatively high concentration has been found to be a particularly effective elutant for removing multivalent cations from the A columns, because of the highly dissociated state of the ammonium bisulfite.

Sulfurous acid is not an efficient elutant for multivalent cations because the same is not highly ionized and therefore, has a relatively weak regenerating effect. Although reducing the temperature of the solution will increase the degree of ionization somewhat and will also increase the solubility of sulfur dioxide in water, it still does not result in a highly efficient elutant. For example, lowering the temperature of the solution of sulfur dioxide from about 25° C. to 5° C. gives an increase in solubility of sulfur dioxide from about 7% to about 13% and thereby increases the eluting ability of the solution but, because the hydrogen ion is a very weak replacing ion, the sulfurous acid is not effective in eluting multivalent cations from the A columns and which may be readily accomplished by utilization of the ammonium bisulfite solution as outlined above.

A feature of the instant process is the fact that none of the ammonium cations are lost during regeneration of the A columns inasmuch as all ammonium cations absorbed onto the A column resins during passage of the ammonium bisulfite solution therethrough eventually pass into the B system and are recovered.

Another important feature of the present process is the fact that the lignosulfonic acid effluent collected in storage tank 254 is substantially free of multivalent cations as outlined above and thus, the lignosulfonic acid may be readily evaporated and burned to produce valuable by-products or the same may be pyrolyzed to form essentially ash-free carbon. Thus, it can be seen that the lignosulfonic acid may be used as a basic raw material for the production of other derivatives and this serves to make the present process attractive from a commercial standpoint.

Having thus described the invention what is claimed as new and desired to be secured by Letters Patent is:

1. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor through a first ion exchange resin having monovalent cations thereon selected from the group consisting of ammonia and alkali metals, to effect preferential exchange of multivalent cations in the waste liquor for said monovalent cations on the resin and producing a lignosulfonate effluent therefrom; subsequently passing the lignosulfonate effluent from said first resin through a second ion exchange resin having hydrogen ions thereon to effect exchange of said monovalent ions in the lignosulfonate effluent for hydrogen ions on the second resin; then passing a solution containing sulfurous acid through the second resin to effect exchange of hydrogen ions of the acid for said monovalent cations on the second resin to thereby simultaneously regenerate the latter and produce a quantity of monovalent cation sulfite pulping liquor; and passing a quantity of a relatively highly dissociated bisulfite regenerant containing said monovalent cations through said first resin upon cessation of passage of waste liquor therethrough, the concentration of monovalent cations in the bisulfite regenerant being sufficiently high to effect exchange of monovalent cations of the bisulfite regenerant for multivalent cations on said first resin to thereby regenerate the latter.

2. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor successively through a pair of first ion exchange resins having monovalent cations thereon selected from the group consisting of ammonia and alkali metals, to effect preferential exchange of multivalent cations in the waste liquor for said monovalent cations on the resins and producing a lignosulfonate effluent therefrom, said passage of the waste sulfite liquor successively through said first resins being continued until a predetermined proportion of multivalent cations begin to leak with the effluent from the first of said pair of first resins; subsequently passing the lignosulfonate effluent from the last of said pair of first resins through at least one second ion exchange resion having hydrogen ions thereon to effect exchange of said monovalent cations in the lignosulfonate effluent for hydrogen ions on the second resin; then passing a solution containing sulfurous acid through the second resin to effect exchange of the hydrogen ions of the acid for said monovalent cations on the second resin to thereby simultaneously regenerate the latter and produce a quantity of monovalent cation sulfite pulping liquor; and passing a quantity of a relatively highly dissociated monovalent cation bisulfite regenerant through the first of said pair of first resins upon cessation of passage of waste liquor therethrough, the concentration of monovalent cations in the bisulfite regenerant being sufficiently high to effect exchange of the monovalent cations of the bisulfite regenerant for multivalent cations on said first of the pair of first resins to thereby regenerate the latter.

3. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor successively through a pair of first ion exchange resins having monovalent cations thereon selected from the group consisting of ammonia and alkali metals, to effect preferential exchange of multivalent cations in the waste liquor for said monovalent cations on the resins and producing a lignosulfonate effluent therefrom, said passage of the waste sulfite liquor successively through said first resins being continued until a predetermined proportion of multivalent cations begin to leak with the effluent from the first of said pair of first resins; subsequently passing the lignosulfonate effluent from the last of said pair of first resins successively through a pair of second ion exchange resins having hydrogen ions thereon to effect exchange of said monovalent cations in the lignosulfonate effluent for hydrogen ions on the second resins, said passage of lignosulfonate effluent successively through said second resins being continued until a predetermined proportion of monovalent cations begin to leak from the first of said pair of second resins; then passing a solution containing sulfurous acid through the first of said pair of second resins upon cessation of passage of said lignosulfonate effluent therethrough to effect exchange of the hydrogen ions of the acid for said monovalent cations on said first of the pair of second resins to thereby simultaneously regenerate the latter and produce a quantity of monovalent cation sulfite pulping liquor; and passing a quantity of a relatively highly dissociated monovalent cation bisulfite regenerant through the first of said pair of first resins upon cessation of passage of waste liquor therethrough, the concentration of monovalent cations in the bisulfite regenerant being sufficiently high to effect exchange of the monovalent cations of the bisulfite regenerant for multivalent cations on said first of the pair of first resins to thereby regenerate the latter.

4. An ion exchange method as set forth in claim 3 wherein passage of waste sulfite liquor throgh said first of the pair of first resins is interrupted when the proportion of multivalent cations contained in the effluent from said first of the pair of first resins reaches substantial equilibrium with the multivalent cations in the waste sulfite liquor passing into said first of the pair of first resins.

5. An ion exchange method as set forth in claim 3 wherein passage of said lignosulfonate effluent through said first of the pair of second resins is interrupted when the proportion of monovalent cations contained in the effluent from said first of the pair of second resins reaches substantial equilibrium with the monovalent cations in the lignosulfonate influent passing into said first of the pair of second resins.

6. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor through a first ion exchange resin having monovalent cations thereon selected from the group consisting of ammonia and alkali metals, to effect preferential exchange of multivalent cations in the waste liquor for said monovalent cations on the resin and producing a lignosulfonate effluent therefrom; subsequently passing the lignosulfonate effluent from said first resin through a second ion exchange resin having hydrogen ions thereon to effect exchange of said monovalent ions in the lignosulfonate effluent for hydrogen ions on the second resin; then passing a solution containing sulfurous acid through the second resin to effect exchange of the hydrogen ions of the acid for said monovalent cations on the second resin to thereby simultaneously regenerate the latter and produce a quantity of monovalent cation sulfite pulping liquor; separating a predetermined fraction of sulfite pulping liquor from said quantity thereof; directing the fraction of sulfite pulping liquor into a quantity of a monovalent cation sulfite solution to produce a regenerant; fortifying said regenerant with a predetermined amount of said monovalent cations; and passing the fortified regenerant through said first resin upon cessation of passage of waste liquor therethrough, the concentration of monovalent cations in the bisulfite regenerant being sufficiently high to effect exchange of the monovalent cations of the regenerant for the multivalent cations on said first resin to thereby regenerate the latter.

7. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor through a first ion exchange resin having monovalent cations thereon selected from the group consisting of ammonia and alkali metals, to effect preferential exchange of multivalent cations in the waste liquor for said monovalent cations on the resin and producing a lignosulfonate effluent therefrom; subsequently passing the lignosulfonate effluent from said first resin through a second ion exchange resin having hydrogen ions thereon to effect exchange of said monovalent ions in the lignosulfonate effluent for hydrogen ions on the second resin; then passing a solution containing sulfurous acid through the second resin to effect exchange of the hydrogen ions of the acid for said monovalent cations on the second resin to thereby simultaneously regenerate the latter and produce a quantity of monovalent cation sulfite pulping liquor; separating a predetermined fraction of sulfite pulping liquor from said quantity thereof; directing the fraction of sulfite pulping liquor into a quantity of a monovalent cation sulfite solution to produce a regenerant; fortifying said regenerant with a predetermined amount of said monovalent cations; adding sufficient sulfurous acid to said regenerant to adjust the pH thereof to a predetermined point; and passing the adjusted and fortified regenerant through said first resin upon cessation of passage of waste liquor therethrough, the concentration of monovalent cations in the bisulfite regenerant being sufficiently high to effect exchange of the monovalent cations of the regenerant for the multivalent cations on said first resin to thereby regenerate the latter.

8. An ion exchange method of treating waste sulfite liquor as set forth in claim 1 wherein the concentration of monovalent cations in said bisulfite regenerant is refortified to within the range of 0.3 to 6.0 gram moles per liter of regenerant and the sulfur dioxide concentration in said regenerant is refortified to produce a resulting solution with a pH in the range of 1.5 to 4.5.

9. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor successively through at least a pair of separate, first ion exchange resins and producing a lignosulfonate effluent therefrom, the first of said first resins being initially in a partially multivalent cation loaded condition from a prior loading cycle and the last of said first resins being substantially saturated with monovalent cations selected from the group consisting of ammonia and alkali metals, whereby preferential exchange of multivalent cations in the waste liquor is effected for said monovalent cations on the first resins; subsequently passing the lignosulfonate effluent from said last of the pair of first resins successively through at least a pair of separate, second ion exchange resins, the first of said second resins initially being in a partially monovalent cation loaded condition from a prior loading cycle and the last of said second resins being substantially in the hydrogen form whereby preferential exchange of monovalent cations in the lignosulfonate effluent is effected for hydrogen ions on the second resins; then passing a solution containing sulfurous acid successively through at least a pair of monovalent cation loaded second resins, the first of said monovalent cation loaded second resins being only partially loaded with said monovalent cations from a prior loading cycle and the last of said monovalent cation loaded second resins being substantially loaded with said monovalent cations whereby exchange of hydrogen ions of the acid is effected for said monovalent cations on the monovalent cation loaded second resins to thereby simultaneously regenerate at least said first of the initially monovalent cation loaded second resins and produce a quantity of monovalent cation sulfite pulping liquor; and passing a predetermined quantity of a monovalent bisulfite regenerant through said first of the first resins after substantial saturation of the latter with multivalent cations and upon cessation of passage of said waste sulfite liquor through the same, the concentration of monovalent cations in the bisulfite regenerant being sufficiently high to effect exchange of monovalent cations of the bisulfite regenerant for multivalent cations on said first of the first resins to thereby regenerate the latter.

10. An ion exchange method of treating the waste sulfite liquor resulting from monovalent cation sulfite pulping of wood wherein the monovalent cation is selected from the group consisting of ammonia and alkali metals for selectively separating said monovalent cations from multivalent cations contained in the liquor comprising the steps of passing the waste liquor through a first ion exchange resin having monovalent cations thereon selected from the group consisting of ammonia and alkali metals, to effect preferential exchange of multivalent cations in the waste liquor for said monovalent cations on the resin and producing a lignosulfonate effluent therefrom; subsequently passing the lignosulfonate effluent from said first resin through a second ion exchange resin having hydrogen ions thereon to effect exchange of monovalent ions in the lignosulfonate effluent for hydrogen ions on the second resin; then passing a solution containing sulfurous acid through the second resin to effect exchange of hydrogen ions of the acid for said monovalent cations on the second resin to thereby simultaneously regenerate the latter and produce a quantity of monovalent cation sulfite pulping liquor; passing a quantity of a relatively highly dissociated bisulfite regenerant containing said monovalent cations through said first resin upon cessation of passage of waste liquor therethrough, the concentration of monovalent cations in the bisulfite regenerant being sufficiently high to effect exchange of monovalent cations of the bisulfite regenerant for multivalent cations on said first resin to thereby regenerate the latter; and removing a substantial quantity of the sulfur dioxide from the bisulfite regenerant effluent from said first resin to effect substantial precipitation of the multivalent cations contained therein as the insoluble sulfites.

11. An ion exchange method of treating waste sulfite liquor as set forth in claim 10 wherein the bisulfite regenerant effluent, subsequent to removal of sulfur dioxide and precipitated multivalent sulfites therefrom, is refortified with monovalent cations and sulfur dioxide whereby the regenerant is again in condition for regenerating said first resin.

12. An ion exchange method of treating waste sulfite liquor as set forth in claim 10 wherein said sulfur dioxide is removed from the bisulfite regenerant by steam stripping to substantially precipitate the multivalent cation sulfites.

13. An ion exchange method of treating waste sulfite liquor as set forth in claim 10 wherein said monovalent cations in said pulping liquor are chosen from the group consisting of ammonium, potassium and sodium.

References Cited in the file of this patent

UNITED STATES PATENTS

| | | |
|---|---|---|
| 1,937,944 | Butler | Dec. 5, 1933 |
| 2,409,861 | Hunter et al. | Oct. 22, 1946 |
| 2,413,784 | Rawlings | Jan. 7, 1947 |
| 2,644,748 | Cunningham | July 7, 1953 |
| 2,778,714 | Kasper et al. | Jan. 22, 1957 |
| 2,801,900 | Benning | Aug. 6, 1957 |
| 2,906,659 | Droland | Sept. 29, 1959 |
| 2,916,355 | Swenson | Dec. 8, 1959 |

FOREIGN PATENTS

| | | |
|---|---|---|
| 717,600 | Great Britain | Oct. 27, 1954 |

OTHER REFERENCES

Kunin et al., in "Ion Exchange Resins," John Wiley & Sons, Inc., New York, 1950, pages 22, 25, 31, 125.